United States Patent [19]
Hewison et al.

[11] Patent Number: 4,712,802
[45] Date of Patent: Dec. 15, 1987

[54] SEALING WASHERS FOR HEADED FASTENERS

[75] Inventors: George D. Hewison, Aldershot; Terence E. Harris, Reading, both of Great Britain

[73] Assignee: Illinois Tool Works Inc., Chicago, Ill.

[21] Appl. No.: 844,790

[22] Filed: Mar. 27, 1986

[30] Foreign Application Priority Data

Apr. 1, 1985 [GB] United Kingdom .............. 8508477

[51] Int. Cl.$^4$ .................. F16J 15/12; F16B 43/00
[52] U.S. Cl. ........................ 277/212 C; 277/166; 277/235 R; 411/542
[58] Field of Search ............ 277/166, 212 R, 212 C, 277/233, 234, 235 R; 411/542, 544

[56] References Cited

U.S. PATENT DOCUMENTS

| | | | |
|---|---|---|---|
| 2,982,573 | 5/1961 | McKee | 411/542 X |
| 3,519,279 | 7/1970 | Wagner | 277/166 |
| 3,606,357 | 9/1971 | Yonkers | 277/235 X |
| 3,661,046 | 5/1972 | Waud et al. | 277/166 X |
| 4,280,390 | 7/1981 | Murray | 411/542 |

FOREIGN PATENT DOCUMENTS

| | | | |
|---|---|---|---|
| 1934799 | 1/1970 | Fed. Rep. of Germany | 277/166 |
| 1553295 | 9/1979 | United Kingdom . | |

Primary Examiner—Robert S. Ward
Attorney, Agent, or Firm—David I. Roche; Thomas W. Buckman

[57] ABSTRACT

A sealing washer comprising an apertured metal backing member, a sealing member of resilient material abutting one face of the backing member forming a laminate therewith, and a shoulder of resilient material abutting the opposite face of the backing member and integral with the sealing member by a connecting portion extending axially through the aperture whereby, in use, a headed fastener may be assembled to the sealing washer with a shank of the fastener extending through the aperture, characterized in that, when considered in any plane including the axis of the aperture, the backing member includes an outer rimmed portion, an intermediate domed portion whose concave surface contacts the sealing member, and an inner depressed portion having first and second parts, the first part of the depressed portion extending more perpendicularly than the second part to the axis of the aperture for assisting in resisting axial spread of the shoulder during use of the sealing washer, and the second part of the depressed portion extending less perpendicularly than the first part to the axis of the aperture for assisting in resisting transverse spread of the shoulder during use of the sealing washer.

9 Claims, 3 Drawing Figures

SEALING WASHERS FOR HEADED FASTENERS

The present invention relates to sealing washers.

More particularly, the present invention relates to sealing washers of the kind (hereinafter referred to as the kind described) comprising an apertured metal backing member, a sealing member of resilient material abutting one face of the backing member forming a laminate therewith, and a shoulder of resilient material abutting the opposite face of the backing member and integral with the sealing member by a connecting portion extending axially through the aperture whereby, in use, a headed fastener may be assembled to the sealing washer with a shank of the fastener extending through the aperture.

Sealing washers of the kind described are disclosed in British Pat. No. 1 553 295. That patent is primarily concerned with a method of production involving: forming in a metal sheet a plurality of spaced apertures; moulding from the resilient material in situ on the sheet in association with each of the apertures the sealing member, the shoulder and the connection portion; and then punching the mouldings and the adjacent backing members out from the metal sheet. It is preferable, but not essential, for the sealing washers of the present invention to be made by the same method.

Sealing washers of the kind described have been found by experience to suffer from several disadvantages.

It has been possible for the backing member to be deformed or even inverted, as a result of forces exerted thereon in use by an adjacent workpiece. For example, when the workpiece has been a clamped roofing sheet which has itself been subjected to wind forces, the backing member has often been inverted thereby permitting the clamped sheet to be more readily pulled over the backing member. Moreover, it has been possible for the shoulder of the resilient material to be sheared off in use by over-tightening a headed fastener associated therewith, particularly when the fastener has exerted an off-centre load as a result of not having been inserted axially through the sealing washer.

An aim of the present invention has been to attempt to overcome these disadvantages in a cheap and easy but reliable and effective manner.

In accordance with the present invention, a sealing washer of the kind described is such that, when considered in any plane including the axis of the aperture, the backing member includes an outer rimmed portion, an intermediate domed portion whose concave surface contacts the sealing member, and an inner depressed portion having first and second parts, the first part of the depressed portion extending more perpendicularly than the second part to the axis of the aperture for assisting in resisting axial spread of the shoulder during use of the sealing washer, and the second part of the depressed portion extending less perpendicularly than the first part to the axis of the aperture for assisting in resisting transverse spread of the shoulder during use of the sealing washer.

The purpose of the rimmed portion is primarily to provide better containment of the sealing member. The purpose of the domed portion is primarily to give greater resistance to inversion of the backing member. The purpose of the depressed portion is primarily to provide better containment of the shoulder.

Preferably:

the domed portion is of substantially elliptical profile;

the first part of the depressed portion extends substantially perpendicularly to the axis of the aperture;

the second part of the depressed portion extends between an inner end of the domed portion and an outer end of the first part of the depressed portion, the inner end of the domed portion being the highest part of the domed portion considered in the direction of the axis of the aperture; and, the shoulder of the resilient material abuts both the first part and the second part of the depressed portion.

The shoulder of the resilent material may extend out of the depressed portion, beyond the highest part of the domed portion considered in the direction of the axis of the aperture, the size of the shoulder being calculated to be such that it can be substantially fully compressed into the depressed portion, with just a small amount of the shoulder spreading outwardly over the highest part of the domed portion to prevent direct contact between the headed fastener and the backing member, without the shoulder being at any time overstressed.

In one embodiment, the rimmed portion extends generally parallel to the axis of the aperture. In another embodiment, the rimmed portion extends generally perpendicular to the axis of the aperture, which facilitates manufacture. In both embodiments, however, it is preferred that engagement means in the form of an inner rib is provided on that face of the sealing member for pressing against a workpiece whereby, during use of the sealing washer, the inner rib is urged inwardly into sealing engagement with the shank of the fastener. The shank may be threaded or unthreaded at the point of sealing engagement. Moreover, in both embodiments it is preferred that indicator means in the form of an outer rib is provided on that face of the sealing member for pressing against a workpiece whereby, during use of the sealing washer, the outer rib is urged outwardly to become at least equal in diameter to the rimmed portion when a correct load setting is achieved. The outer rib thus remains hidden, when viewed axially of the sealing washer in the direction of insertion of the headed fastener, until the headed fastener has been correctly tightened.

Naturally, the backing member is formed of any suitable metal (e.g. galvanised steel, aluminium, etc) and the sealing member, shoulder and connecting portion are formed of any suitable resilient material (e.g. rubber, natural or synthetic).

Two sealing washers, in accordance with the present invention, will now be described, by way of example only, with reference to the accompanying drawings, in which.

Figure 1:
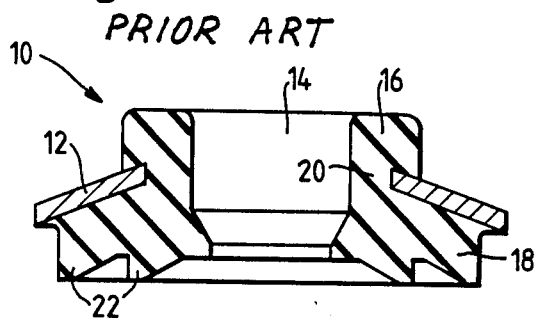
FIG. 1 is a cross-section through a typical example of the prior art.

With reference to the prior art exemplified by FIG. 1, a sealing washer 10 includes a metal backing member 12 formed with an aperture 14. A body of resilient material is "wrapped around" at least parts of both faces of the backing member 12 and presents a shoulder 16, a sealing member 18 and a connecting portion 20. The operative clamping face of the sealing member 18 is formed with a pair of concentric ridges 22.

The prior art suffered from several disadvantages. The shoulder 16 was likely to be sheared off from the connecting portion 20 by the head of a headed fastener whose shank extended through the aperture 14. The backing member 12, even though of hollow frusto-conical shape, was likely to be inverted.

Figure 2:
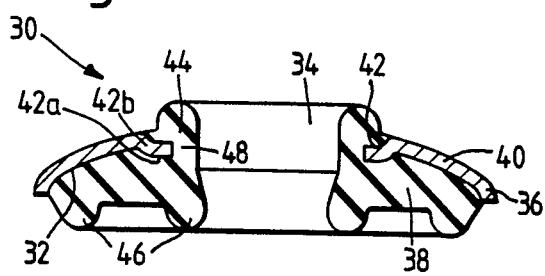
FIG. 2 is a cross-section through a first sealing washer according to the present invention; and, FIG. 3 is a cross-section through a second sealing washer according to the present invention.

These disadvantages are tackled by the present invention, with the sealing washer 10 being changed as discussed hereinafter to form a sealing washing 30 in accordance with the present invention and shown in FIG. 2.

A backing member 32 of the washer 30, when considered in any plane including the axis of aperture 34, includes (a) an outer rimmed portion 36 which extends generally parallel to the axis of the aperture 34 for better containment of sealing member 38, (b) an intermediate domed portion 40, preferably of substantially elliptical profile, whose concave surface contacts the sealing member 38 for greater resistance to inversion of the backing member 32, and (c) an inner depressed portion 42 having a first part 42a and a second part 42b for better containment of a shoulder 44.

The first part 42a of the depressed portion 42 extends substantially perpendicularly to the axis of the aperture 34 for assisting in resisting axial spread of the shoulder 44 in use, and the second part 42b of the depressed portion 42 extends less perpendicularly than the first part 42a to the axis of the aperture 34 for assisting in resisting transverse spread of the shoulder 44 in use. As shown in FIG. 2, the second part 42b of the depressed portion 42 extends between an inner end of the domed portion 40 and an outer end of the first part 42a of the depressed portion 42, the inner end of the domed portion 40 being the highest part of the domed portion 40 considered in the direction of the axis of the aperture 34, and the shoulder 44 of the resilient material abutting both the first part 42a and the second part 42b of the depressed portion 42.

The operative clamping face of the sealing member 38 is formed with a pair of concentric ribs 46 of rounded cross-section, and the sealing member 38 is joined to the shoulder 44 by a connecting portion 48.

The shoulder 44 extends out of the depressed portion 42, beyond said highest part of the domed portion 40, the size of the shoulder 44 being such that even if the head of the fastener is tightened to more than the ideal amount, the material of the shoulder 44 contained within the cavity defined by the depressed portion 42 and the highest part of the domed portion 40 is not overstressed.

Figure 3:
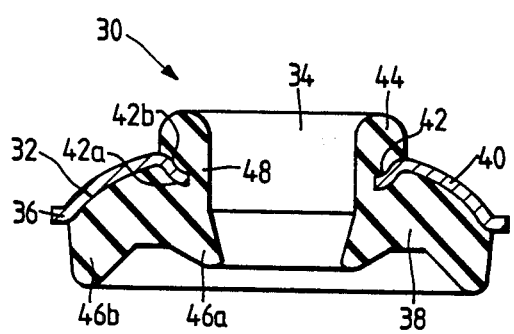

Another sealing washer in accordance with the present invention is shown in FIG. 3 and, for convenience, those features of the sealing washer in FIG. 3 which are functionally equivalent to corresponding features of the sealing washer in FIG. 2, will be given the same reference numbers.

One difference is that the outer rimmed portion 36 in FIG. 3 extends generally perpendicularly to the axis of the aperture 34. Another difference is that the junction between the first part 42a and the second part 42b of the depressed portion 42 is not as distinct as in FIG. 2.

The inner rib 46a in FIG. 3 forms engagement means so that, in use, said inner rib 46a is urged inwardly into sealing engagement with the shank of the fastener. The outer rib 46b in FIG. 3 forms indicator means so that, in use, said outer rib 46b is urged outwardly to become at least equal in diameter to the rimmed portion 36 when a correct load setting is achieved.

It will be appreciated that the washer 10, and both of the washers 30, are circular in plan with all planes including the axis of their apertures being identical.

We claim:

1. A sealing washer comprising an apertured metal backing member, a sealing member of resilient material abutting one face of the backing member forming a laminate therewith, and a shoulder of resilient material abutting the opposite face of the backing member and integral with the sealing member by a connecting portion extending axially through the aperture whereby, in use, a headed fastener may be assembled to the sealing washer with a shank of the fastener extending through the aperture, characterized in that, when considered in any plane including the axis of the aperture, the backing member includes an outer rimmed portion, an intermediate domed portion whose concave surface contacts the sealing member, and an inner depressed portion having first and second parts, the first part of the depressed portion extending more perpendicularly than the second part to the axis of the aperture for assisting in resisting tranverse spread of the shoulder during use of the sealing washer and indicator means in the form of an outer rib is provided on that face of the sealing member for pressing against a workpiece whereby, during use of the sealing washer, the outer rib is urged outwardly to become at least equal in diameter to the rimmed portion when a correct load setting is achieved.

2. A sealing washer according to claim 1, characterised in that the domed portion is of substantially elliptical profile.

3. A sealing washer according to claim 1, characterised in that the first part of the depressed portion extends substantially perpendicularly to the axis of the aperture.

4. A sealing washer according to claim 1, characterised in that the second part of the depressed portion extends between an inner end of the domed portion and an outer end of the first part of the depressed portion, the inner end of the domed portion being the highest part of the domed portion considered in the direction of the axis of the aperture.

5. A sealing washer according to claim 1, characterised in that the shoulder of the resilient material abuts both the first part and the second part of the depressed portion.

6. A sealing washer according to claim 1, characterised in that the shoulder of the resilient material extends out of the depressed portion, beyond the highest part of the domed portion considered in the direction of the axis of the aperture.

7. A sealing washer according to claim 1, characterised in that the rimmed portion extends generally parallel to the axis of the aperture.

8. A sealing washer according to claim 1, characterised in that the rimmed portion extends generally perpendicular to the axis of the aperture.

9. A sealing washer according to claim 1, characterised in that engagement means in the form of an inner rib is provided on that face of the sealing member for pressing against a workpiece whereby, during use of the sealing washer, the inner rib is urged inwardly into sealing engagement with the shank of the fastener.

* * * * *